United States Patent Office.

JACOB J. KAMM, OF FORT WAYNE, INDIANA.

Letters Patent No. 63,727, dated April 9, 1867.

IMPROVEMENT IN BURNING FLUID.

The Schedule referred to in these Letters Patent and making part of the same.

TO ALL WHOM IT MAY CONCERN:

Be it known that I, JACOB J. KAMM, of Fort Wayne, in the county of Allen, and State of Indiana, have invented certain new and useful Improvements in Illuminating Non-Explosive Burning Fluid; and I do hereby declare that the following is a full, clear, and exact description thereof.

The nature of my invention consists in so combining certain chemicals that, when properly prepared and ready for use, they form a valuable non-explosive illuminating fluid of great brilliancy, which can be used in any form of lamp in use. The chief objects to be attained are to produce a fluid that will not give off its carbon during combustion in greater quantities than can be completely and entirely consumed, and that will at all times and under all circumstances be free from all danger of explosion.

To enable others skilled in the arts to compound and use my invention, I will proceed to describe its combination and the constituent parts thereof.

First, I dissolve two drachms of sulphate of alumina and potassa in four drachms of alcohol; then add and mix one drachm of camphor, one drachm of potassa, two ounces of chloride of sodium, one-half drachm of acetate of lead, and one quart of naphtha. When the parts are dissolved, expose the mixture to the action of the atmosphere five hours, when it is ready for use.

This new combination possesses in a remarkable degree the qualities of yielding its carbonated gas in the necessary proportion required to sustain active combustion when used in an ordinary no-chimney lamp, thus preventing the escape of free carbonic acid gas, which, in a great or less degree, would affect the brilliancy of the illumination, and create a very unpleasant odor. It follows, hence, that as combustion is active and perfect the illumination must be excessively brilliant. Another strikingly important advantage gained by its use is that it is entirely non-explosive, thus entirely obviating the constant danger to which so many are daily exposed. It may be used for many purposes where alcohol is now used for producing an intense heat without gas, as for the blow-pipe, &c. This fluid will not ignite the lightest fabrics which have been saturated in it and set on fire; neither will it soil them.

What I claim as new, and desire to secure by Letters Patent, is—

The combination of the within-specified ingredients, in the manner described, for the purpose of forming an illuminating non-explosive burning fluid.

J. J. KAMM. [L. S.]

Witnesses:
GEO. W. JONES,
A. J. PARSHALL.